US011865868B2

(12) United States Patent
Bardin et al.

(10) Patent No.: US 11,865,868 B2
(45) Date of Patent: Jan. 9, 2024

(54) TREAD COMPRISING HIDDEN CAVITIES AND GROOVES

(71) Applicant: COMPAGNIE GENERALE DES ETABLISSEMENTS MICHELIN, Clermont-Ferrand (FR)

(72) Inventors: Damien Bardin, Clermont-Ferrand (FR); Romain Berthier, Clermont-Ferrand (FR); Fabien Marlier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 279 days.

(21) Appl. No.: 17/416,339

(22) PCT Filed: Dec. 11, 2019

(86) PCT No.: PCT/FR2019/053020
§ 371 (c)(1),
(2) Date: Jun. 18, 2021

(87) PCT Pub. No.: WO2020/128235
PCT Pub. Date: Jun. 25, 2020

(65) Prior Publication Data
US 2022/0080777 A1 Mar. 17, 2022

(30) Foreign Application Priority Data

Dec. 21, 2018 (FR) ........................................ 1873836
Jan. 30, 2019 (FR) ........................................ 1900864

(51) Int. Cl.
*B60C 11/03* (2006.01)
(52) U.S. Cl.
CPC ... *B60C 11/0323* (2013.01); *B60C 2011/0381* (2013.01); *B60C 2200/06* (2013.01)

(58) Field of Classification Search
CPC ............. B60C 11/0323; B60C 11/1281; B60C 2011/0381
See application file for complete search history.

(56) References Cited

U.S. PATENT DOCUMENTS 6,315,018 B1* 11/2001 Watanabe ........... B60C 11/0306
152/DIG. 3
2016/0318348 A1* 11/2016 Cambon ............. B60C 11/1307

FOREIGN PATENT DOCUMENTS

EP 2323858 9/2008
FR 3 061 081 6/2018
(Continued)

OTHER PUBLICATIONS

Office Action dated Jul. 25, 2022 issued in Chinese Patent Application No. 201980083261.5.

*Primary Examiner* — Justin R Fischer
*Assistant Examiner* — Wendy L Boss
(74) *Attorney, Agent, or Firm* — Cozen O'Connor

(57) ABSTRACT

Tread for heavy-duty vehicle tire, having tread surface in the new state, having a first volume of cavities opening onto the tread surface, a second volume of cavities formed entirely under the tread surface and having at least one channel of height Hc delimited by two main walls spaced apart from one another by a width Lc and connected together by a lower part and by an upper part, this channel intended to form, after partial wear corresponding to a thickness Lu, an additional groove, such that each channel has a plurality of extensions forming cavities extending between this channel and the tread surface over a height He at least equal to 20% and at most equal to 75% of the thickness Lu, each extension opening at least into the upper part of the channel through an opening having a cross-sectional area Sa at least equal to 0.8*(Hc*Lc).

13 Claims, 5 Drawing Sheets

(56) References Cited

FOREIGN PATENT DOCUMENTS

| | | |
|---|---|---|
| FR | 3 061 082 | 6/2018 |
| WO | WO 2012/130735 | 10/2012 |
| WO | WO 2013/095406 | 6/2013 |
| WO | WO 2013/150143 | 10/2013 |
| WO | WO 2016/191443 | 12/2016 |
| WO | WO 2018/122496 | 7/2018 |

* cited by examiner

[Fig 1]
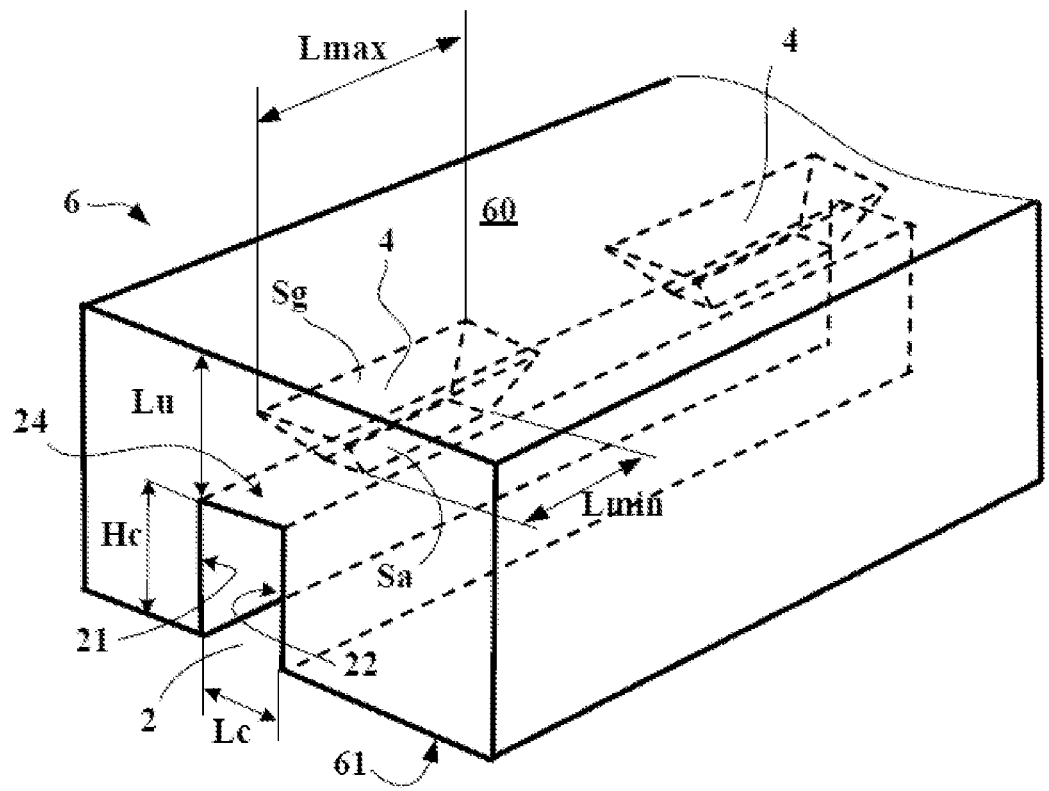
[Fig 2]
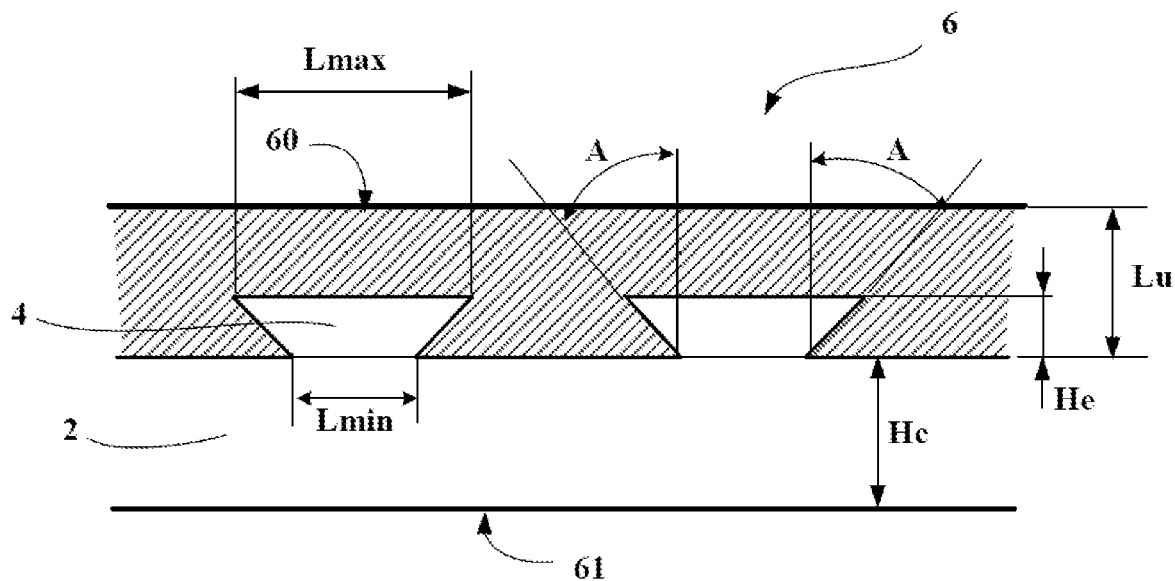

[Fig 3]
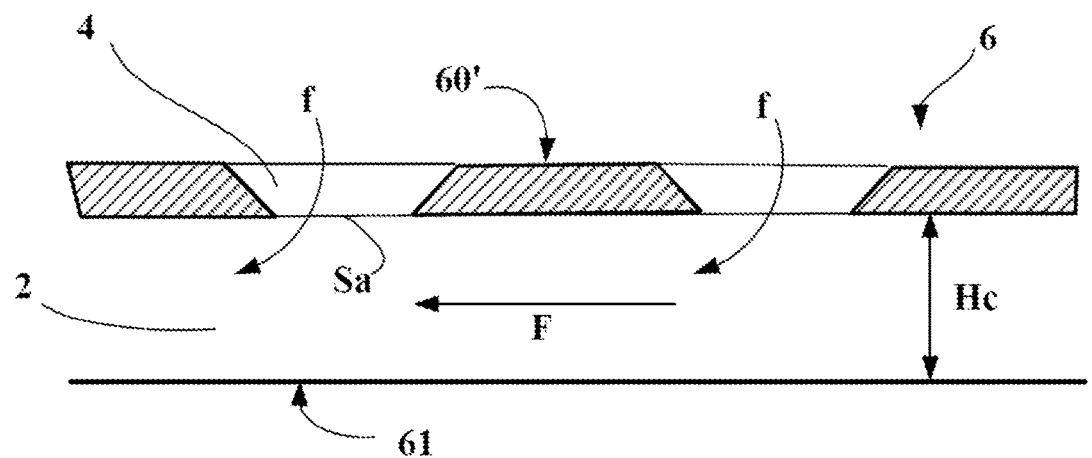
[Fig 4]
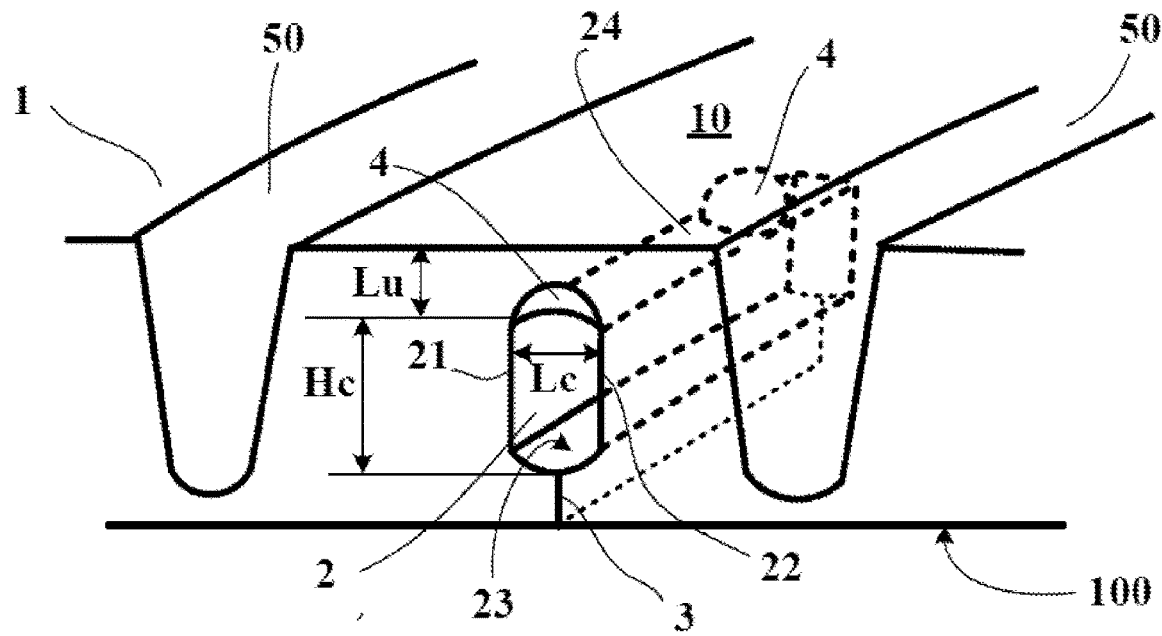

[Fig 5]
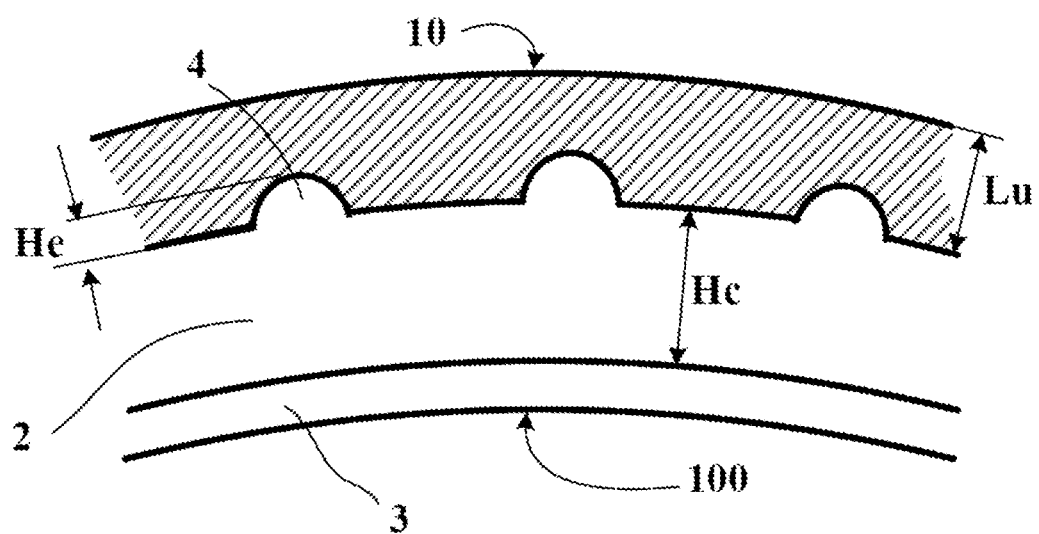
[Fig 6]
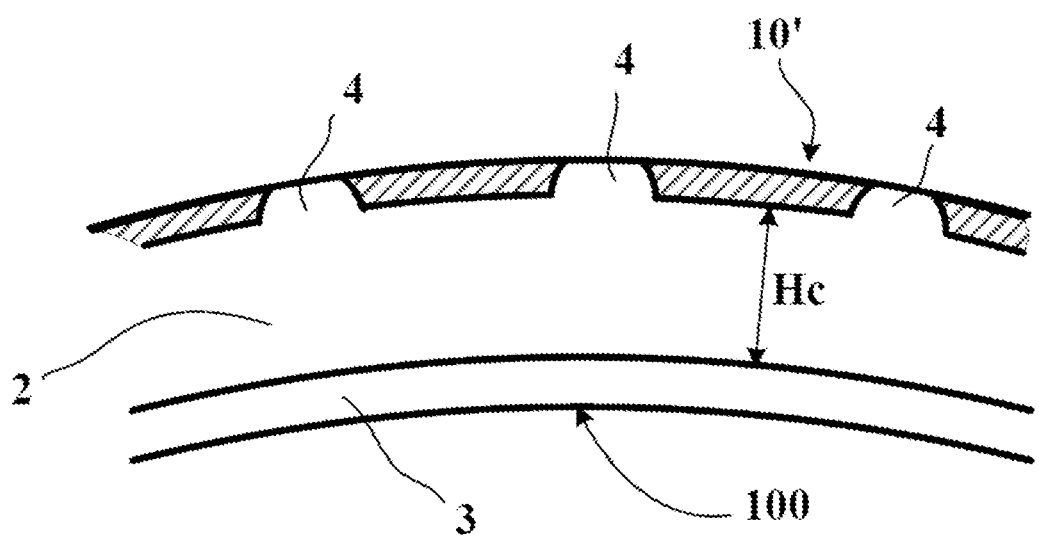

[Fig 7]
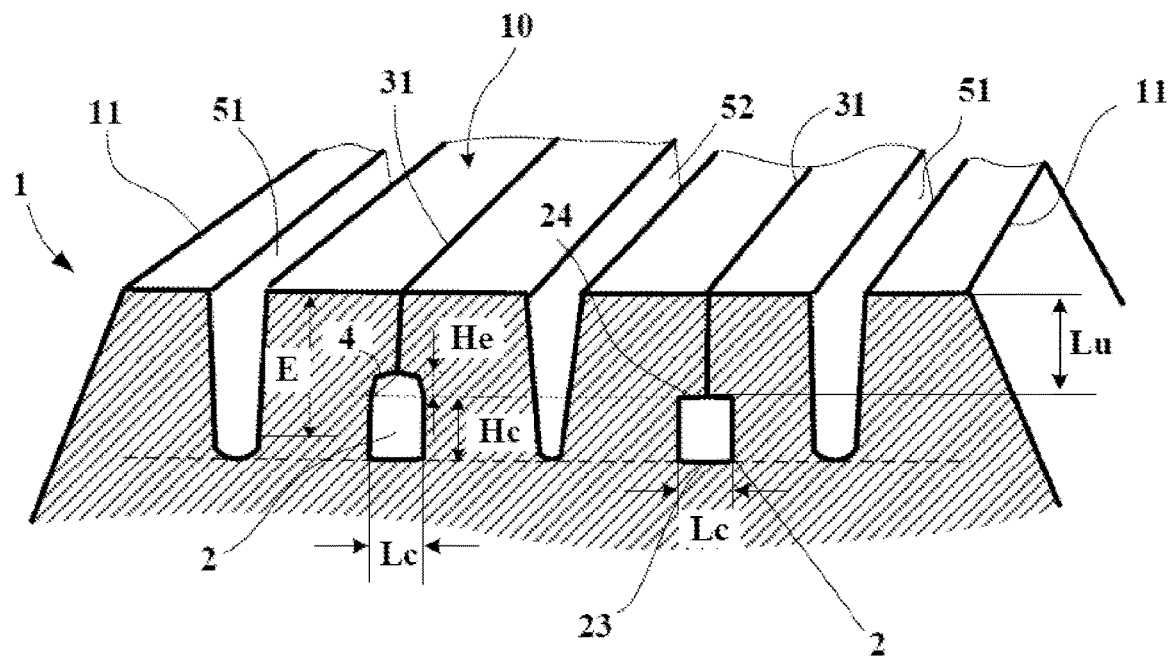
[Fig 8]
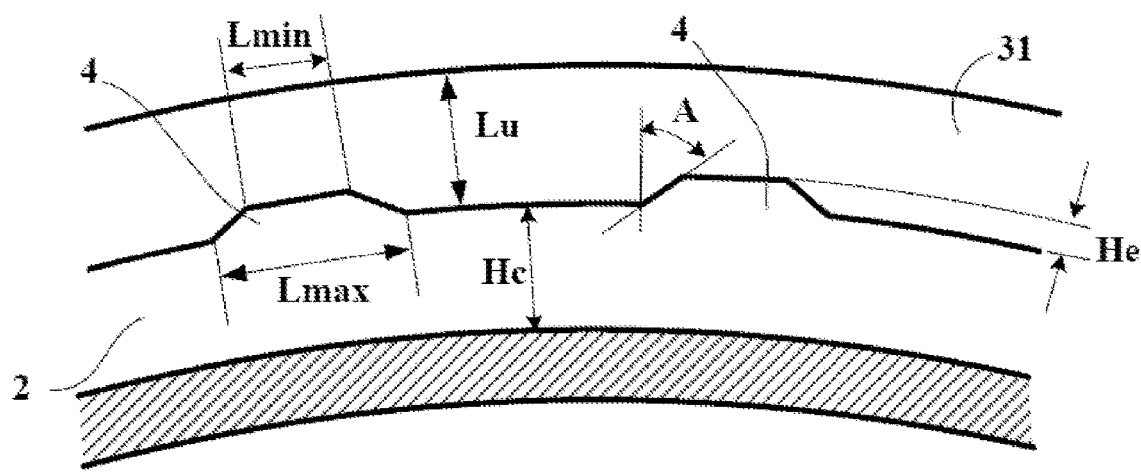

[Fig 9]
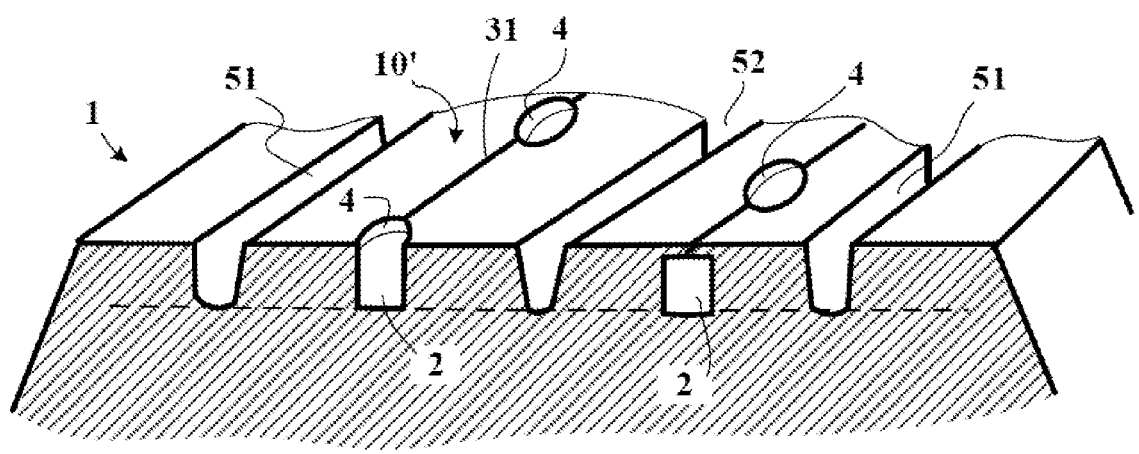

TREAD COMPRISING HIDDEN CAVITIES AND GROOVES

RELATED APPLICATIONS

This is a U.S. National Phase Application under 35 USC 371 of International Application PCT/FR2019/053020 filed on Dec. 11, 2019.

This application claims the priority of French application nos. FR 18/73836 filed Dec. 21, 2018 and FR/1900864 filed Jan. 30, 2019, the entire content of all of which are hereby incorporated by reference.

FIELD OF THE INVENTION

The invention relates to treads for heavy-duty vehicle tires and more particularly to the arrangements of voids with which these treads are provided, which have a lasting ability to drain away water present on the road surface in times of wet weather, these treads having improved performance in terms of running and in terms of their ability to withstand external attack.

Definition

The tread of a tire denotes the part of the tire that is intended to come into contact with the road surface via a tread surface. This tread gradually wears down as the tire runs along.

A cut means any cavity or void produced in particular by moulding in a tread for a tire, a cut extending both into the depth of the tread and in a main direction—which can be taken as being the direction in which water flows in the cut when running in times of wet weather. This main direction corresponds to the greatest dimension of the cut on the tread surface.

A groove that is open in the new state means a cut that opens onto the tread surface of a tread in the new state, this groove being delimited by facing walls, the mean distance between these walls being appropriate for these walls not to be in contact with one another under normal use conditions of the tire.

A sipe means a thin cut having a small mean width, this mean width, which corresponds to the mean distance between the facing walls that delimit it, being such that, under normal use conditions of the tire, these walls are, at least partially, in contact with one another when in the contact patch in which the tire is in contact with the road surface.

A hidden cavity means a cavity that is formed under the tread surface in the new state of the tread, this cavity being able to be intended to form a new groove that opens onto the new tread surface created after a predetermined amount of partial wear. A hidden cavity is delimited by two facing main walls, these two main walls being connected to one another by a lower part forming a bottom and by an upper part that continues these walls radially towards the outside. A sipe may open into this upper part to connect the hidden cavity to the tread surface in the new state. Viewed in cross section, a hidden cavity may adopt any geometric shape, in particular circular, rectangular, triangular.

The thickness of tread material to be worn away means the thickness of tread material that can be worn away during running before the legal tread wear limit is reached, this limit being able to be identified by tread-wear indicators formed in particular in the grooves. When this limit has been reached, intervention is necessary in order to reform a new design of voids on the tread, to fit a new tread or to change the tire.

In the present description, the term radial or radially is used to indicate a direction which, when considered on the tire, is a direction perpendicular to the axis of rotation of the tire. This same direction, when considered on a tread alone, corresponds to the direction of the thickness of said tread.

Moreover, the term circumferential is used to indicate a direction which corresponds to a direction tangential to any circle centred on the axis of rotation of the tire. This circumferential direction corresponds to the longitudinal direction of the tread when the latter is made in the form of a flat strip before it is incorporated into the manufacture of a new tire or the retreading of a worn tire.

The term transverse or axial refers to a direction that is parallel to the axis of rotation of the tire. This direction is perpendicular to the radial direction and to the circumferential direction. A direction is said to be oblique when it forms an angle other than zero with the circumferential or longitudinal direction on a tread.

PRIOR ART

BACKGROUND OF THE INVENTION

As is known, wet-weather driving conditions require the most rapid possible elimination of the water between the tread of each tire and the road surface so as to ensure that the tread makes contact with this road surface. The water which is not pushed ahead of or to the sides of the tire is collected and flows in grooves formed in the tread of the tire, these grooves opening onto the tread surface in the new state. These grooves can be oriented in the circumferential direction or the transverse direction or in an oblique direction that is somewhere between the previous two directions, or in a combination of these directions.

Whatever the tire category, the tread of this tire needs to afford a water drainage performance that is always above a minimum performance level known as the safe performance. Given that the tread gradually wears away when running, this progressively reducing the cross-sectional areas of the grooves and consequently the ability of these grooves to remove a given amount of water, it is commonplace to produce grooves that open onto the tread surface in the new state and continue into the thickness of the tread down to at least a level that corresponds to a legal tread wear limit requiring the tread to be withdrawn in order either to renew the tread by retreading or to change the tire.

The disadvantage of creating such a plurality of grooves that open onto the tread surface of a tread is that it reduces the amount of material for a given width of tread and in this way appreciably reduces the stiffness of the tread, this having an impact on the wearing performance. As a result, in order to address the loadings experienced by the tread during running, a person skilled in the art needs to compensate for these reductions in stiffness by any means at their disposal, notably by adapting the internal structure of the tire, something that is, of course, not without its own impact on the manufacturing cost of the tire itself. These reductions in stiffness can also adversely affect the wear rate, the evenness of this wear, and some of the expected performance aspects during running.

Furthermore, an increase in the rolling resistance is observed, which is connected with the cycles of greater deformation of elastomer materials that form the tread, this manifesting itself in an appreciable increase in the fuel consumption of the vehicles fitted with such tires.

In order to solve such a problem, the document EP 2323858-B1 proposes forming hidden cavities entirely under the tread surface of the tread in the new state, these hidden cavities being continued towards the tread surface of the tread in the new state by a sipe that can have a flat or wavy geometry. With this type of tire, it is possible, as required, to renew a greater or lesser proportion of the initial drainage volume once the tread has reached a predetermined level of wear.

Similarly, it has been proposed to extend the hidden cavities with wells that open both into a hidden cavity and onto the tread surface of the tread in the new state (publication WO 2016191443-A1).

It is of course known to combine the presence of grooves that open onto the tread surface in the new state and of hidden voids that form additional grooves after partial wear of the tread. These additional grooves at least partially make up for the loss of volume of the grooves initially open onto the tread surface in the new state, this loss being associated with the wearing of the tread.

While the latter proposition has a certain advantage, there remains room for improvement in particular as regards the achievement of a smaller reduction in stiffness linked to the presence of voids that open onto the tread surface in the new state and as regards the improvement of the wearing performance—in particular the achievement of better regularity (meaning no or little localized or irregular wear) of the tread after the additional grooves formed by the hidden cavities have appeared.

SUMMARY OF THE INVENTION

The present invention relates to a solution to this problem of irregular wear that can occur during the formation of a new groove when a hidden cavity under the tread surface of a new tread opens, while limiting the introduction of foreign bodies into these hidden cavities during running.

To this end, one subject of the invention is a tread for a heavy-duty vehicle tire having a total thickness E corresponding to the total thickness of material to be worn away during running. This tread has, in the new state, a tread surface intended to come into contact with a road surface when a tire provided with this tread is running. This tread surface is renewed progressively with the wear caused by running on the road surface.

This tread comprises a first volume of cavities that open onto the tread surface in the new state, and a second volume of cavities that are formed entirely under the tread surface in the new state, this second volume of cavities comprising at least one channel of height Hc delimited by two main walls, these two main walls, which are spaced apart from one another by a maximum width Lc, being connected together by a lower part forming a bottom and by an upper part that continues these walls radially towards the outside.

This channel is intended to form, after partial wear corresponding to a thickness Lu, an additional groove that opens onto the tread surface, this channel comprising a plurality of extensions forming cavities, each extension opening at least into the upper part of this channel through an opening having a cross-sectional area Sa at least equal to 0.8*(Hc*Lc), said extension extending between said channel and the tread surface in the new state over a height He at least equal to 20% and at most equal to 75% of the thickness of material Lu measured between the upper part of the channel and the tread surface in the new state. Moreover, the respective openings of two successive extensions of one and the same channel, in the upper part of the channel, are separated by a bridge of material of which the length, measured in the upper part of the channel in the main direction of the channel, is at least equal to 2 times the width Lc of the channel, typically at least equal to 10 mm.

Advantageously, each extension opens into said channel through an opening of cross section Sa having a width Le equal to the width Lc of the channel in order to limit the pressure losses in a flow of water when the extensions open onto the tread surface after partial wear.

The partial wear from which the channel creates an additional groove corresponds to a thickness Lu equal to at least 30% and at most 85% of the depth E of material to be worn away during running.

Preferably, the opening of each extension into a channel has an elongate shape in the main direction of the channel (this main direction being the direction of the length of the channel in which water flows when running on a road surface covered in water). This extension can have a constant or variable cross section. When the cross section is variable, Lmax denotes the maximum length of the cross section of the extension considered in a section plane parallel to the tread surface, and Lmin denotes the minimum length of the cross section of the extension considered in another section plane parallel to the same tread surface.

Preferably, the maximum length Lmax of an extension is greater than the minimum length Lmin of the same extension, these two lengths being measured in one and the same direction; advantageously, a ratio Lmax/Lmin at least equal to 1.5 is chosen.

In order to achieve better drainage from the outside to the inside of the channel, the cross section of each extension from when it opens onto the tread surface after partial wear decreases down to the cross section Sa. This geometry also limits the risk of objects being captured in the channel.

According to another variant of the invention, each extension has an appropriate geometry in order that any cross-sectional area considered between the cross section of the opening into the channel and the part of the extension closest to the tread surface in the new state is less than the cross-sectional area Sa.

Advantageously, and when the cross sections of the extensions decrease from the outside to the inside of the tread, the mean angle that the faces delimiting each extension make with a radial direction is at least equal to 15° (the radial direction corresponds to the direction of the thickness of the tread). This disposition reduces the risk of large stones being introduced into the inside of the channel.

Advantageously, the extensions of one and the same channel do not all open onto a tread surface at the same amount of partial wear, these extensions having different heights He.

Advantageously, when the tread comprises a plurality of circumferentially oriented channels, the extensions are offset circumferentially between the different channels in order to reduce running noise when the extensions open onto the tread surface after partial wear.

Advantageously, when the tread comprises a plurality of circumferentially oriented channels, the extensions formed on two channels of one and the same tread open onto the tread surface at different amounts of wear.

While it is possible to mould a tread having such a distribution of both open and hidden voids by moulding said tread by way of its external face (moulding the tread surface of the tread) and by way of its internal face, the latter being intended to be brought into contact with the external surface of a green tire, it is nevertheless easier to continue each hidden cavity as far as the tread surface in the new state with a sipe of appropriate width, this sipe also being able to have a suitable geometry for limiting the reduction in stiffness of the tread. The abovementioned sipe may adopt any suitable geometric shape, in particular have zigzags or undulations in its depth so as to at least partially compensate for the loss of stiffness associated with the very presence of this sipe.

By virtue of this disposition of the cavity volumes in a tread and of the presence of a plurality of extensions placing the channels in communication with the outside of the tire after a predetermined amount of partial wear, it is possible to limit the occurrence of irregular wear and to ensure good behaviour under normal running conditions, throughout the use of the tread, be it in the new state or any intermediate state of wear before reaching the wear limit set by the manufacturer. Furthermore, the risks of attack associated with the introduction of attacking bodies into the hidden channels are reduced.

Further features and advantages of the invention will become apparent from the following description provided with reference to the appended drawings which show, by way of non-limiting example, embodiments of the subject matter of the invention.

BRIEF DESCRIPTION OF THE DRAWINGS

FIG. 1 shows a first variant according to the invention of a rib of a tread inside which a channel is moulded, this channel being surmounted by a plurality of extensions in the overall shape of a funnel;

FIG. 2 shows, in cross section, the rib shown in FIG. 1 in the new state;

FIG. 3 shows, in cross section, the rib shown in FIG. 1 in a partially worn state;

FIG. 4 shows a second variant in which the geometry of the extensions has a cross-sectional area that increases from its opening after partial wear;

FIG. 5 shows, in cross section, the second variant shown in FIG. 4 in the new state;

FIG. 6 shows, in cross section, the second variant shown in FIG. 4 in the partially worn state;

FIG. 7 shows a partial view of a third variant according to the invention of a tread in the new state;

FIG. 8 shows, in cross section, the third variant shown in FIG. 7;

FIG. 9 shows a partial view of the third variant shown in FIG. 7 after the tread has become partially worn.

To make the figures easier to understand, identical reference signs have been used to describe variants of the invention where these reference signs refer to elements of the same kind, whether in terms of structure or function.

FIG. 1 shows a first variant of the invention, showing, on its own, a rib 6 of a tread inside which a hidden channel 2 is moulded, this channel 2 being delimited by main walls 21, 22, these walls being joined together by an upper part 24. In the present case, this hidden channel 2 is moulded on the internal face 61 of the tread, this internal face 61 being intended to be positioned on a green tire and held in place by adhesion. This hidden channel 2 has a height Hc and a width Lc and is intended to form an additional groove after partial wear Lu measured with respect to the tread surface formed in part by the external surface 60 of the rib.

In the upper part 24 of the hidden channel 2, a plurality of cavities forming extensions 4 have also been moulded. These extensions 4 have a funnel-shaped geometry, the opening cross section Sa over the channel being smaller than all the other cross sections, these cross sections being considered parallel to the external surface 60 of the rib 6. Each extension 4 is substantially funnel-shaped, the largest of the cross sections Sg having a maximum length Lmax measured in the main direction of the hidden channel 2 and a width substantially equal to the width Lc of the hidden channel 2. The cross section Sa of the opening in the channel at least equal to 0.8*(Hc*Lc) has a length Lmin measured in the main direction of the hidden channel 2 and a width smaller than the width of the hidden channel 2. As can be seen in FIG. 2, the walls delimiting each extension 4 make one and the same angle A with respect to the radial direction—the direction of the thickness of the tread—this angle being greater than 15 degrees.

FIG. 2 shows the rib in FIG. 1 in the new state in a section plane parallel to the main direction of the rib 6 and perpendicular to the external surface 60 of this rib. The extensions 4 are situated entirely inside the rib 6 and are provided to open simultaneously onto the tread surface obtained after partial wear equal to the difference between Lu (wear at which a new continuous groove is formed) and the height He of the extensions. In the case shown, the height He is around one third of the distance Lu between the upper part of the channel and the external surface 60 in the new state.

FIG. 3 shows, in the same section plane, the rib 6 shown in FIG. 1 and FIG. 2 in a partially worn state, enough to open all the extensions 4 onto the new tread surface 60'. When running on a road surface covered in water, the openings of the extensions 4 are able to drain, towards the inside of the hidden channel 2, the various elementary flows f to generate a main flow F inside said channel.

By virtue of this disposition, it is possible to have, in the new state, stiffness suitable for a tread of a heavy-duty vehicle tire by reducing the volumes of cavities open onto the tread surface in the new state and by renewing the void volume after a predetermined amount of wear, while ensuring greater regularity of the wearing the tread regardless of the level of wear thereof.

FIG. 4 shows a part of a tread 1 in the new state according to a second variant of the invention.

In this second variant, a channel 2 formed inside a tread 1 in the new state can be seen, this channel 2 being situated entirely under the tread surface 10 in the new state and being intended to form a new groove after wear corresponding to a loss of material over a height Lu in order, in particular, to compensate for the decrease in the void volumes of the grooves 50 that exist in the new state. This channel 2 is oriented in the longitudinal direction of the tread (direction equivalent to the circumferential direction on the tire provided with this tread). This channel 2 is delimited by main walls 21, 22 that are spaced apart from one another by a mean distance Lc, these main walls being joined together both in a lower part 23 and in an upper part 24. The mean distance between the lower part and the upper part represents the height Hc of the channel.

In the case described, the lower part 22 of the channel 2 is the part of the channel furthest away from the tread surface 10; this lower part is continued by a sipe 3 that makes moulding by way of the internal face 100 of the tread 1 easier. This sipe 3 extends in the main direction of the channel, that is to say in the circumferential direction, that is to say in the direction in which the water flows when the channel is open onto the tread surface and forms a new groove. The internal face 100 of the tread 1 is intended to be secured to the external surface of a green tire that does not have a tread.

Moreover, a plurality of extensions 4 are moulded on the upper part 24 of the channel 2, each extension 4 forming a cavity of hemispherical geometry of radius He, this radius being equal, in the case presented, to half the width Lc of the channel 1. These extensions 4 are intended to open onto the tread surface after a predetermined amount of wear and thus to place the inside of the channel 2 into communication with the outside of the tread. These extensions 4 thus form kinds of wells that allow fluids to circulate from the outside to the inside of the channel and vice versa.

The shape chosen for each extension 4 creates a gradual and increasing variation in the opening cross section at the tread surface with wear. This geometry is favourable both in terms of wear (greater uniformity thereof) and in terms of limiting the penetration of foreign objects into the channel. The maximum cross section is reached at the opening in the upper part of the channel and is at least equal to 0.8*(Hc*Lc).

FIG. 5 shows a longitudinal section (that is to say a section in a plane perpendicular to the tread surface and passing through the sipe 3) through this second variant in the new state. The channel 2 extended towards the tread surface 10 by a plurality of extensions 4 having the form of cavities with a circular section of radius He can be seen. The part of the tread between these extensions 4 and the tread surface 10 in the new state does not in this case have any sipes in order to achieve maximum stiffness in this part. The extensions 4 open to the outside after wear corresponding to a loss of thickness equal to the difference between the height Lu of the opening in the upper part of the channel 2 and the height He of the extensions 4.

FIG. 6 shows the same longitudinal section through this second variant after partial wear opening the extensions 4 onto the new tread surface 10'. It is apparent that the geometry of the extensions 4 makes it possible to have an opening cross section at the tread surface 10' that increases gradually with wear until the upper part of the channel 2 is opened, thereby forming an additional groove.

FIG. 7 shows a partial view in cross section of a third variant according to the invention of a tread 1 in the new state. This variant relates to a tread of a tire of size 385/65 R 22.5 intended to be fitted to an axle of a heavy-duty vehicle. This tread 1 comprises, in the new state, as can be seen in this FIG. 7, a tread surface 10 intended to come into contact with the roadway during running.

This tread 1 has a total width of 297 mm and comprises three main grooves that open in the new state onto the tread surface of the tread, these grooves being oriented longitudinally. The two main grooves 51 situated close to the lateral edges 11 of the tread have a depth equal to 14 mm and a width equal to 14.7 mm at the tread surface and equal to 11.7 mm at the bottom of the groove. The main groove 52 centred on the mid-plane of the tread has a depth of 14 mm and widths equal to 12.8 mm and 4.5 mm at the tread surface and at the bottom of the groove, respectively.

Moreover, this tread 1 comprises two channels 2 that are longitudinally oriented (that is to say circumferentially on the tire provided with this tread), as are the main grooves 51, 52. These channels 2 are disposed alternately with the main grooves 51, 52 and are intended to form additional grooves after partial wear has reduced the available void volume of the grooves that open in the new state onto the tread surface. Each channel 2 has a cross section of square overall shape. Each channel 2 is delimited by facing walls that are spaced apart from one another by a mean distance Lc, in this case equal to 6.7 mm, these facing walls being joined together both in a lower part 23 forming the bottom of the channel and in an upper part 24. The mean distance between the lower part and the upper part is referred to as the height Hc of the channel and is equal in the present case to 6.7 mm. The bottom of the channel is located at the same distance from the tread surface in the new state as the bottom of the main grooves. The thickness Lu to be worn away before the channel 2 opens onto the tread surface is equal to 7.9 mm.

The thickness E indicated in FIG. 7 represents the wear limit of the tread, that is to say the limit from which a renewal operation is necessary (regrooving, retreading or changing of the tire). This thickness is less than the maximum depth of the main grooves.

In addition, a plurality of extensions 4 are formed in the upper part 24 of each channel 2, each extension 4 having the shape of an elongate cavity in the main direction of said channel. Each extension 4 has a width Lp equal to the width Lc of the channel 2 on which it is formed and a minimum length Lmin in its part furthest away from said channel and a maximum length Lmax at its opening onto said channel (these lengths are shown in FIG. 8 and are measured in the longitudinal direction), said opening having a cross section at least equal to 0.8*(Hc*Lc).

In the case described, the minimum length Lmin is equal to 6.5 mm and the maximum length Lmax is equal to 13 mm. The ratio between the maximum length Lmax and minimum length Lmin is equal to 2.

In the new state, the example described shows a tread having a total volumetric voids ratio equal to 13% including the volumes of all the cavities (grooves, channels and sipes). This voids ratio is established by calculating the volume of all the cavities and relating it to the volume of a tread comprised between the tread surface in the new state and a surface parallel to the tread surface in the new state that passes through the innermost points of the cavities in the tread.

In order to make it easier to industrially implement and in particular mould and demould the tire provided with a tread as described, it is advisable to extend the hidden cavities (channels 2 and extensions 4) with a sipe 31 of small width (0.6 mm in the present case) as far as the tread surface 10 in the new state, this sipe 31 extending in the longitudinal direction. When in the contact patch in contact with the road surface, each sipe 31 closes at least partially and thus helps to limit the reduction in stiffness associated with the very presence of this sipe, while preventing the penetration of liquid into the channel.

FIG. 8 shows a longitudinal section (that is to say a section in the direction of the channel) through the tread 1 of this third variant in the new state. The section plane in this case corresponds to the plane of the sipe 31. The channel 2 extended towards the tread surface 10 by a plurality of extensions 4 in the form of cavities of height He and maximum length Lmax measured in the main direction of the channel and over the opening thereof onto said channel can be seen. In this example, the distance Lu is equal to 7.9 mm, the height He is equal to 2.1 mm. The spacing between two extensions 4 measured in the longitudinal direction is in this case equal to 62 mm. This permanently ensures the presence, for one and the same hidden channel, of at least three extensions 4 that are open in the contact patch in contact with the road surface under working conditions, when the level of wear has allowed these extensions to open onto the tread surface. The working conditions for the tire described here are: inflation pressure equal to 9 bar and load supported equal to 4500 kg; under these conditions, the mean length of contact is 210 mm.

In this example, the ratio Lmax to Lmin is equal to 2 (13 mm/6.5 mm).

The angle A of the walls delimiting the extensions 4 is equal to 30 degrees with respect to the radial direction (that is to say over the thickness of the tread).

FIG. 9 shows a partial view of the third variant shown in FIG. 7 after the tread 1 has become partially worn. At this stage of tread wear, all the extensions 4 formed on each channel 4 are open onto the new tread surface 10'. It is apparent that each extension 4 has an opening to the outside, the cross section of which increases with wear so as to be at a maximum where it is joined to the channel (the angle A shown in FIG. 5 reflects this widening).

In the embodiment described, the two channels 2 are extended by a plurality of extensions 4 which all open after one and the same thickness of tread has been worn away. However, a circumferential offset is provided between the openings of the extensions of one channel and those of the adjacent channel in order to optimize the collection of water from the road surface in the contact patch and reduce the impact on running noise.

In the case of channels with different geometric features, it would be possible to adjust the appearance of the respective openings onto the tread surface with or without an offset in the thickness.

The invention is not limited to the three examples presented and various modifications can be made thereto without departing from its scope as defined in the claims. In particular, the description given in respect of cavities with a longitudinal main orientation could be applied to any other orientation, and in particular to a transverse or oblique orientation. In the same way, it is possible to combine circumferentially oriented channels and transversely oriented channels, these two types of channels each having a plurality of extensions that place these channels into communication with the outside after wear.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tread for a heavy-duty vehicle tire, having a tread surface when new and which contacts a road surface when running, the tread comprising:
   a first volume of cavities which open onto the tread surface when new;
   a second volume of cavities formed entirely under the tread surface which contacts the road surface when new, said second volume of cavities comprising at least one channel of height Hc delimited by two main walls which are spaced apart from one another by a width Lc and which are connected together by a lower part forming a bottom and by an upper part which continues the two main walls radially towards an outside of the tire, and said channel forming, after partial wear corresponding to a thickness Lu, an additional groove which opens onto the tread surface;
   wherein each channel comprises a plurality of extensions forming cavities, each extension of the plurality of extensions extending parallel to said channel and extending between said channel and the tread surface over a height He at least equal to 20% and at most equal to 75% of a thickness of material Lu between the upper part of the channel and the tread surface when new, and each extension of the plurality of extensions opening at least into the upper part of the channel through an opening having a cross-sectional area Sa at least equal to $0.8*(Hc*Lc)$; and
   wherein a cross section of each extension as said extension opens onto the tread surface after partial wear of the tread surface decreases in a direction toward the cross section Sa.

2. The tread according to claim 1, wherein the thickness Lu from which the channel creates an additional groove is equal to at least 30% and to at most 85% of the thickness E of material to be worn away.

3. The tread according to claim 1, wherein each extension opens into a channel through an opening having a cross-sectional area Sa of which the width is equal to the width Lc of the channel.

4. The tread according to claim 1, wherein the opening of each extension into a channel has an elongate shape in a main direction of the channel which forms a direction of a length of the channel in which water flows when running on a road surface covered in water, a maximum length Lmax of a cross section of the extension being greater than a minimum length Lmin thereof, the minimum and maximum lengths being measured in an identical direction.

5. The tread according to claim 4, wherein a ratio between the maximum length Lmax of the cross section of the extension and the minimum length Lmin of the cross section of the extension is at least equal to 1.5.

6. The tread according to claim 1, wherein any cross-sectional area considered between a cross section of the opening into the channel and a part of the extension closest to the tread surface when new is less than a cross-sectional area Sg of the extension over the channel.

7. The tread according to claim 6, wherein an angle of main faces delimiting each extension is at least equal to 15 degrees to a radial direction.

8. The tread according to claim 1, wherein each channel comprises at least two extensions in contact with the road surface under working conditions, when these extensions open onto a tread surface after partial wear.

9. The tread according to claim 1, wherein a sipe continues each channel and extension as far as the tread surface in the new state.

10. The tread according to claim 1, wherein the tread comprises at least two channels each provided with extensions, said extensions being offset circumferentially with respect to one another from one channel to the other.

11. The tread according to claim 1, wherein the tread comprises at least two channels provided with extensions, said extensions opening at different amounts of partial wear of the tread.

12. The tread according to claim 1, wherein the extensions of one and the same channel do not all open at the same amount of partial wear.

13. A tire for a heavy-duty vehicle, comprising a tread according to claim 1.

* * * * *